United States Patent [19]
Hinley et al.

[11] 3,942,999
[45] Mar. 9, 1976

[54] PIGMENTS

[75] Inventors: John James Hinley, Middlesbrough; David Malcolm Porter, Yarm, both of England

[73] Assignee: British Titan Limited, Billingham, Teesside, England

[22] Filed: Aug. 15, 1974

[21] Appl. No.: 497,615

[30] Foreign Application Priority Data
Sept. 22, 1973 United Kingdom............... 44538/73

[52] U.S. Cl................................ 106/300; 106/308 N
[51] Int. Cl.$^2$........................ C09C 1/36; C08J 3/00
[58] Field of Search........................ 106/308 N, 300

[56] References Cited
UNITED STATES PATENTS

| | | | |
|---|---|---|---|
| 3,178,303 | 4/1965 | Aagaard............................ | 106/300 |
| 3,345,187 | 10/1967 | Binnis.......................... | 106/308 N X |
| 3,506,466 | 4/1970 | Bramekamp et al............... | 106/300 |
| 3,514,304 | 5/1970 | Binnis............................... | 106/300 |
| 3,567,479 | 3/1971 | Portes et al................. | 106/308 N X |
| 3,649,323 | 3/1972 | Roe et al. .................. | 106/308 N X |
| 3,658,566 | 4/1972 | Sheehan et al. ............ | 106/308 N X |
| 3,699,041 | 10/1972 | Sanderford et al. ........ | 106/308 N X |
| 3,756,841 | 9/1973 | Beliveau ..................... | 106/308 N X |

*Primary Examiner*—Patrick P. Garvin
*Assistant Examiner*—William G. Wright
*Attorney, Agent, or Firm*—Schuyler, Birch, Swindler, McKie & Beckett

[57] ABSTRACT

Titanium dioxide pigments carrying diisopropanolamine have good dispersibility, minimum tendency to foaming, minimum retardation of drying time and develop high opacity without the requirement for the presence of water. Preferably, the pigments also carry one or more hydrous metal oxides, a phosphate and/or a silicate. The preferred method of manufacture of the pigmentary titanium dioxide is to dry mill the pigment in the presence of the diisopropanolamine.

19 Claims, No Drawings

PIGMENTS

This invention relates to pigments and particularly to titanium dioxide pigments carrying an organic compound on their surface.

It has been the practice for many years to treat the surface of the particles of titanium dioxide pigments with inorganic hydrous oxides, phosphates and/or silicates to modify the properties of the pigment when incorporated in, say, a paint. Also, treatment of the particles with an organic compound has been used to improve the dispersibility of the pigment in paint or other media.

For instance, the pigments have been treated with triethanolamine which, although improving the dispersibility of the pigment in an oil based paint medium, has resulted in the paint possessing an extended drying time. Other common organic treatment agents for titanium dioxide pigments are pentaerythritol and trimethylolpropane. Both of these when used to treat a titanium dioxide pigment increase the ease of dispersibility of the pigment in an oil based paint medium but a pigment treated with trimethylolpropane when used in paper applications has a tendency to foam within the paper stock or coating with the result that the finished paper may develop pin holes or other blemishes on drying.

Hitherto the majority of titanium dioxide pigments manufactured have been sold in paper sacks or similar containers which has allowed the pigment to pick up moisture from the atmosphere. Pigment is now being delivered to customers in bulk and sealed containers or bins, and during storage and delivery the pigment is not able to acquire any moisture. This bulk delivered pigment, which may be described as 'dry' pigment, has been found to produce a paint having a reduced opacity particularly when the pigment has been treated with pentaerythritol or trimethylolpropane.

Thus there is a need to treat titanium dioxide pigments with an agent which will ease the dispersibility of the pigment in an oil based paint medium whilst reducing any tendency to foaming during paper applications, to minimise retardation of drying and to produce a pigment which develops its full potential in opacity without the requirement of the presence of moisture associated with the pigment.

According to the present invention a pigment comprises pigmentary titanium dioxide, the particles of which carry diisopropanolamine.

It has been found that a titanium dioxide pigment carrying diisopropanolamine is easy to disperse in an oil based paint medium, produces a paint having an acceptable drying time and opacity even when the pigment is used in the 'dry' state and does not produce foam in paper applications.

Diisopropanolamine is a waxy solid and it has been found that the amount of diisopropanolamine retained by the pigment may be from 0.05 to 2% by weight based on the weight of pigment. Preferably the amount is from 0.1 to 0.6% by weight.

The pigmentary titanium dioxide may be that produced for example by either the well known 'Sulphate' process or the 'Chloride' process. In the latter process titanium tetrachloride is oxidised in the vapour state at a high temperature. The titanium dioxide pigment may be present either in the anatase or rutile configuration.

Usually the titanium dioxide pigment, prior to treatment with the diisopropanolamine, will have been treated with one or more inorganic surface treating agents so that the surface of the pigment carries one or more hydrous metal oxides, a phosphate and/or a silicate. For instance, the surface of the pigment may carry one or more hydrous oxides of titanium, aluminium, cerium, silicon, zirconium, or zinc. The surface may also carry a phosphate such as aluminium phosphate, zirconium phosphate, titanium phosphate or may carry a silicate such as aluminium silicate. If desired, a hydrous silica coating may be present that is precipitated under conditions such that the coating is non-porous to produce a pigment that has enhanced durability. For instance, by precipitating the hydrous silica from a source of 'active' silica at a pH of between 8 and 11 a non-porous coating of hydrous silica is obtained which encapsulates the particles of titanium dioxide.

The titanium dioxide pigment may be coated with two or more different hydrous oxides simultaneously or may be provided with two or more successive coatings of the same or different hydrous oxides. For instance the pigment may have a first coating of a non-porous silica with an outer coating of hydrous alumina.

The methods employed for the deposition of the hydrous metal oxide coatings phosphate and/or silicate are well known, usually these methods involve the hydrolysis of a hydrolysable metal compound or a silicate in an aqueous slurry of the pigment.

If desired, particularly when the titanium dioxide pigment is prepared by the vapour phase oxidation of a titanium tetrahalide, the particles may be provided with a coating of a non-hydrous metal oxide such as aluminium oxide, titanium oxide or silicon oxide in the gas stream carrying the particles of titanium dioxide. Such coated titanium dioxide pigments may be further treated by a well known 'wet' coating procedure to precipitate one or more hydrous oxides, phosphates, and/or silicates.

The amount of hydrous oxide coating usually employed is from 0.5 to 25% (as the oxide) by weight based on the weight of pigment, but the actual amounts employed for any one given pigment are chosen to suit the particular final desired use of the pigment. For instance, for a pigment that is to be used in oil based paints it has been found convenient to treat the titanium dioxide pigment to deposit a hydrous oxide of a metal in an amount of from 0.5 to 6% (as the oxide) by weight on weight of pigment. For a pigment that may be used in an aqueous paint, it has been found desirable to increase the amount of hydrous oxide of silicon to an amount within the range say 9 to 15% as $SiO_2$ by weight of pigment and to apply also a coating of aluminium in an amount of from, say, 2 to 7% as $Al_2O_3$ by weight of pigment.

It has been found preferable that the diisopropanolamine should be applied to the pigment at a stage subsequent to any wet milling process. During the manufacture of titanium dioxide pigments it is usual to wet mill the pigment prior to coating with one or more hydrous oxides and a convenient wet milling process is that in which the pigment is passed as a slurry into a mill containing a grinding medium such as sand. Subsequently the pigment is usually hydro-classified and then subjected to the desired coating procedure with one or more hydrous metal oxides, a phosphate or a silicate. The pigment at any stage subsequent to the wet grinding process may be treated with the diisopropanolamine although it has been found particularly advantageous to carry out this treatment after coating the pigment with one or more hydrous oxides.

Accordingly, a process for the treatment of pigmentary titanium dioxide comprises mixing pigmentary titanium dioxide with diisopropanolamine subsequently to any wet grinding process of the pigment.

The most convenient manner of treating the titanium dioxide pigment is to add the diisopropanolamine to the pigment whilst this is being fluid energy milled. Fluid energy milling of pigment is carried out usually as the last stage in their production and the pigment is fluid energy milled in the dry state by passing the pigment into the mill together with a fluid grinding medium such as steam or air, so that contact of the particles of pigment with one another effects grinding to the final desired pigmentary size.

The pigments may be subjected to one or more fluid energy milling procedures and the diisopropanolamine may be added to the pigment prior to entering of the pigment into the fluid energy mill either at the first or any subsequent milling stage. It has been found particularly advantageous to fluid energy mill the pigment twice and to add the diisopropanolamine to the pigment immediately prior to the first milling stage.

The diisopropanolamine may be added to the pigment in the solid form either by hand or by means of a suitable feeder, such as a vibratory feeder, prior to entering into the mill, or alternatively the diisopropanolamine may be rendered liquid, for example by melting or by dissolving in a solvent such as water, and the liquid then added to the titanium dioxide. When the diisopropanolamine is added in the form of a solution then it has been found advantageous that the solution should contain from 50 to 90% by weight of the diisopropanolamine. During fluid energy milling the high temperature effects a distribution of the diisopropanolamine over the surface of the pigment particles and the organic material is retained on the pigment on discharge from the mill.

Alternatively the diisopropanolamine may be added to the pigment at any stage between the wet milling process and the fluid energy milling operation. For instance the solution of diisopropanolamine may be added to a stirred slurry of titanium dioxide which is obtained immediately after coating and the diisopropanolamine distributed throughout the pigment by the stirring action. The slurry is then filtered prior to drying and fluid energy milling. Alternatively the diisopropanolamine may be added directly to the hot titanium dioxide pigment obtained from the drier after coating for instance by spraying the dried material with liquid diisopropanolamine or a solution thereof.

Usually the amount of diisopropanolamine retained by the pigment is a substantial proportion of the amount originally added.

Titanium dioxide pigment carrying on the surface of its particles diisopropanolamine is particularly useful for the manufacture of oil based paints. For instance, the pigment may be used for paints based on long oil soya alkyd resins, polyurethane alkyd resins and silicon oil alkyd resins.

It is in this oil-based type of paint that the full advantage of the use of the pigments of the invention are to be seen, but the pigments may be used in aqueous emulsion paints or industrial finishes such as those based on acrylic resin or in plastics in paper applications if desired. Typically an oil-based paint may contain from 25% to 50% by weight of the pigment.

When the pigment is used to manufacture an oil-based paint it has been found that it can be dispersed easily in the paint medium. The paint has an adequate drying time and the pigment develops its full opacity potential even when used in a dry state.

In addition when the pigments are used for paper application the pigments have no tendency to cause foaming in the stock or in the coating composition.

The invention is illustrated in the following Examples.

EXAMPLE 1

A rutile titanium dioxide pigment which had been prepared by the Sulphate process and milled by a wet milling process prior to coating was employed. The pigment had been coated with hydrous oxides of titanium (1.5% by weight as $TiO_2$) of aluminium (2.0% by weight as $Al_2O_3$) and of silicon (1.1% by weight as $SiO_2$ which had been added prior to the wet milling stage as sodium silicate to aid dispersion of the pigment), all weights based on total weight of pigment. After coating the pigment had been dried.

Samples of the dried pigment were then subjected to double milling in a fluid energy mill with various organic compounds added to the pigment immediately prior to its introduction into the mill for the first pass. The amount of organic compound added was 0.4% based on pigment weight. The pigments were fluid energy milled under the following operating conditions Pigment feed rate — 500 lbs. per hour
Total steam flow — 850 lbs. per hour
Steam/Pigment ratio — 1.7:1 for each pass
Injection steam pressure — 235 p.s.i.
Grinding steam pressure — 173 p.s.i.

A sample of the pigment was fluid energy milled under similar conditions without the addition of the organic compound.

The particular organic compounds tested were pentaerythritol (PE), triethanolamine (TEA), monoisopropanolamine (MIPA), and diisopropanolamine (DIPA).

The dispersibility, opacity, drying times and foaming tendencies of the pigments obtained measured as described hereinafter. The results of the measurements are shown in Table 1.

TABLE 1

| Organic | Dispersibility | Opacity (dry pigment) | Drying Time (hours) A | B | Foaming Test |
|---|---|---|---|---|---|
| None | 18 – 42 | 500.0 | 5 | 28.5 | Pass |
| PE | 10 – 20 | 491.5 | 6 | — | " |
| TEA | 8 – 15 | 514.0 | 7 | 41 | " |
| MIPA | 11 – 21 | 504.0 | 5 | 28 | " |
| DIPA | 7 – 13 | 513.5 | 4.5 | 27 | " |

As will be seen treatment with diisopropanolamine produced a pigment having an opacity which is fully developed even when dry without any increased drying time compared with either the pigment free of organic compound or that treated with PE. DIPA gave a pigment with bettwer drying time that TEA and better opacity when dry than MIPA and PE.

A pigment carrying trimethylolpropane produces a foam stable for 20 minutes in the foaming test and would be unsatisfactory for use in paper applications.

Dispersibility was determined by the use of a Cowles Dissolver (described, for example, in "Organic Coating Technology" Vol. II (Pigments and Pigmented Coatings) pp 1010 to 1015 by H. F. Payne and in "Modern Surface Coatings" by P. Nylen and E. Sutherland pp. 542 to 543) in conjunction with R.E.L. fineness of grind gauge (manufactured by Research Equipment (London) Ltd.) which was calibrated from 0 to 50 microns.

248 g of the pigment to be tested was dispersed in 93g of a 40% solution in white spirit of a commercially obtainable pentaerythritol-modified long oil soya alkyd resin (BECKOSOL P470) for 6 minutes in the Cowles Dissolver and an additional 27g of the 40% resin solution were added over the last 30 seconds of stirring. 85g of the resulting dispersion was then mixed with an additional 66g of 70% resin solution and 12.5g of white spirit by trundling on rollers for 30 minutes. The resulting paint was allowed to stand for 1 hour (to deaerate) before testing on the R.E.L. gauge in the usual manner as described in British Standard Specification No. 3900 Part C6 for example. The figures given under the heading "Dispersibility" indicate the points on the gauge (micrometres) between which separate particles are visible and in decreasing numbers from the lower to the higher figures. Generally, the smaller of the figures the better the dispersion of the pigment in the paint medium under the standard dispersing conditions.

Opacity was measured as follows.

The pigment to be tested was first dried in an oven at 110°C for 16 hours to remove associated $H_2O$ and 45g of the pigment was mixed in 33g of a mill base (containing 13g of a commercially obtainable 70% solution in white spirit of a pentaerythritol-modified, long oil soya alkyd resin (BECKOSOL P470) and 20g white spirit). This mixture was ball milled for 16 hours and a further 78g of the 70% resin solution, 6.4 ml of naphthenate drier solution (prepared by mixing 83g of a solution of cobalt naphthenate containing 6% cobalt, 208g of a solution of lead naphthenate containing 24% lead, and 250g of a solution of calcium naphthenate containing 4% calcium and making up to a total volume of 1 liter with white spirit) and 1.5 ml of methyl ethyl ketoxime were added. This mixture was thoroughly mixed by trundling for 2 hours in the presence of glass ballotini.

A sample (140g) of the mixture thus produced was mixed thoroughly with 10 ml white spirit and 25 ml of the resulting paint was spun on to a glass panel 4 × 4 inches in size. The paint was poured on to the centre of the spinning panel (at 459 r.p.m.) and spinning was continued for 30 seconds.

To the remaining paint a further 3 ml of white spirit was added and thoroughly mixed and another glass panel was prepared as described above.

A further 2 ml white spirit was added to the remaining paint and spun on to a third glass panel. After another addition of 2 ml of white spirit to the remaining paint a fourth coated glass panel was prepared. The panels produced had paint films of different thicknesses and were allowed to dry in the absence of sunlight before testing as described below.

The uncoated sides of the panels were placed over a black glass tile coated with glycerine (to improve optical contact) and the reflectance measured at five points on the surface by a Harrison Colorimeter using the green filter. The Harrison Colorimeter was calibrated with a standard reflecting surface before the first measurement and between the measurements on each panel.

The coated panels were then cut to obtain from the centre of each a square of approximately 7 cms. The precise dimensions of this were measured with a ruler calibrated in half mm units. It was then weighed, the paint film removed and the panel re-weighed to obtain the weight of paint on the panel.

The density of the paint is obtained from the known density of the dried unpigmented resin and of the pigment and from these two quantities i.e. the weight and the density, the film thickness on the panels can be calculated.

The mean of the five reflectance measurements on each panel was found and these quantities plotted against the inverse of the film thickness of that panel to provide a straight line graph for the pigment under test. The reflectance for a film thickness of 22 microns was obtained from the graphs and was taken as the opacity. This is the figure given in Table 1.

The drying time test was carried out as follows:

A 45g sample of the pigment under test was mixed into 33g of a mill base containing 12g of a commercially available 75% solution in white spirit of a pentaerythritol modified, long oil linseed alkyl resin (Paralac 10) and 21g of white spirit. This mixture was ball milled for 16 hours and a further 63g of the 75% resin solution, 12g of white spirit and 1.6g of a naphthenate drier solution (prepared by mixing 118.2g of a solution of cobalt naphthenate containing 6% cobalt and 296g of a solution of lead naphthenate containing 24% lead and making up to a total volume of 1 liter with white spirit), were added. This mixture was thoroughly mixed by trundling for 1 hour in the presence of glass ballotini and then allowed to stand for 1 hour (to deaerate).

Three specimen tubes were completely filled with the paint so obtained and the stoppers screwed tightly on to the tubes to prevent skin formation on the paint. The tubes were then allowed to stand for at least 4 days before the drying time of the paint was measured. Paint from one tube was drawn on to three separate 12 × 1 inch glass slides using a Beck-Koller paint applicator giving a wet film thickness of 0.015 inches. The slides were then placed on a Beck-Koller drying time recorder kept in a room with a constant temperature of 21°C and humidity of 66% and the recorder was started on a scale giving the full movement of the needles in 22 hours. The slides were removed after this period and a mark was made on the slide at the point where the needle no longer penetrated the paint film. The distance of this mark from the point where the needle first entered the paint film represents the through-drying time of the paint film and was measured using the special ruler provided with the Recorder. The mean of the through-drying time figures obtained from the three slides was taken as the drying time and results are reported under Column A in the foregoing Table.

Using paints from one of the remaining two specimen tubes the drying time measurements were repeated except that in this case the Recorder was kept in a room at a constant temperature of 5°C and the Recorder was started on a scale giving the full movement of the needles in 44 hours. The results from these measurements are reported under Column B in the foregoing Table.

The paint in the remaining specimen tube was available for a repeat determination in case there was inconsistency in the initial three readings under either set of atmospheric conditions. Under these circumstances the whole series would have been repeated since the test gives only comparative figures, but the results obtained in this case did not require repetition.

The foaming tendency of the pigments in aqueous systems was measured by mixing 5g of each pigment with 100 ml of distilled water in a 100 ml stoppered measuring cylinder. The cylinder was shaken by hand for approximately 15 seconds and the time taken for the foam to clear was then measured. If the foam was stable for more than 45 seconds the pigment was considered to have failed the test.

EXAMPLE 2

A rutile titanium dioxide pigment was used as described in Example 1. Samples of the dried pigment were subjected to double milling in a fluid energy mill with various organic compounds added to the pigment immediately prior to its introduction into the mill for the first pass. The amount of organic compound added was 0.4% based on pigment weight.

A number of samples of the pigments were tested by the tests described in Example 1 and the results are shown in Table 2.

TABLE 2

| Organic | Dispersibility | Opacity (dry pigment) | Drying Time (hours) A | Foaming Test |
|---|---|---|---|---|
| DIPA | 8 - 17 | 515.5 | 4¾ | Pass |
| DIPA | 10 - 20 | 514.5 | 4 | Pass |
| PE | 9 - 18 | 503.0 | 4¾ | Pass |
| PE | 9 - 18 | 502.0 | 4½ | Pass |
| TMP | 8 - 17 | 506.0 | 4¾ | Fail |

The results show that all the organic additions give excellent dispersibility but DIPA also gives better opacity than PE or TMP, and does not fail the foaming test as does TMP. In this experiment the paint drying time of all the pigments was good. A commercially available TEA treated pigment with identical constitution had a drying time of 6½ hours.

What is claimed is:

1. A pigmentary titanium dioxide the particles of which carry diisopropanolamine in an amount of from 0.05 to 2% by weight based on the weight of pigment.

2. A pigmentary titanium dioxide as claimed in claim 1 which the particles also carry one or more hydrous metal oxides in an amount of from 0.5 to 25% (as oxide) by weight based on the weight of pigment.

3. Pigmentary titanium dioxide according to claim 1 which the amount of diisopropanolamine is from 0.1% to 0.6% by weight of pigment.

4. Pigmentary titanium oxide according to claim 1 in which the particles also carry one or more hydrous metal oxides, a phosphate or a silicate.

5. Pigmentary titanium dioxide according to claim 2 in which the hydrous oxide is present in an amount of from 0.5 to 6% (as oxide) by weight.

6. Pigmentary titanium oxide according to claim 4 in which the hydrous oxide is selected from the group consisting of a hydrous oxide of titanium, aluminium, cerium, silicon, zirconium and zinc.

7. Pigmentary titanium dioxide according to claim 4 in which the particles carry a hydrous oxide of silicon in an amount of from 9 to 15% $SiO_2$ and a hydrous oxide of aluminum in an amount of 2 to 7% as $Al_2O_3$ both based on the weight of pigment.

8. Pigmentary titanium dioxide according to claim 1 in which the particles also carry a non-hydrous metal oxide selected from the class of oxides of aluminium, titanium and silicon.

9. A process for the treatment of pigmentary titanium dioxide comprising mixing pigmentary titanium oxide with diisopropanolamine in an amount such that the dry pigment carries 0.05 to 2% by weight diisopropanolamine based on the weight of pigment.

10. The process of claim 9 wherein said pigmentary titanium dioxide is wet milled before treating with diisopropanolamine.

11. A process according to claim 9 in which the pigmentary titanium dioxide is treated with the diisopropanolamine during the fluid energy mill stage of pigment preparation.

12. A process according to claim 10 in which the pigmentary titanium dioxide is treated with the diisopropanolamine during the fluid energy mill stage of pigment preparation.

13. A process according to claim 11 in which the diisopropanolamine is added to the pigmentary titanium dioxide prior to entering the fluid energy mill.

14. A process according to claim 13 in which the diisopropanolamine is in solid form when added to the pigmentary titanium dioxide.

15. A process according to claim 13 in which the diisopropanolamine is molten when added to the pigmentary titanium dioxide.

16. A process according to claim 13 in which the diisopropanolamine is dissolved in a solvent therefore when added to the pigmentary titanium dioxide.

17. A process according to claim 16 in which the diisopropanolamine is dissolved in water.

18. A process according to claim 16 in which the solution contains from 50 to 90% by weight of the diisopropanolamine.

19. A process according to claim 11 in which the pigmentary titanium dioxide is fluid energy milled twice and the diisopropanolamine is added immediately prior to the first fluid energy milling stage.

* * * * *